UNITED STATES PATENT OFFICE.

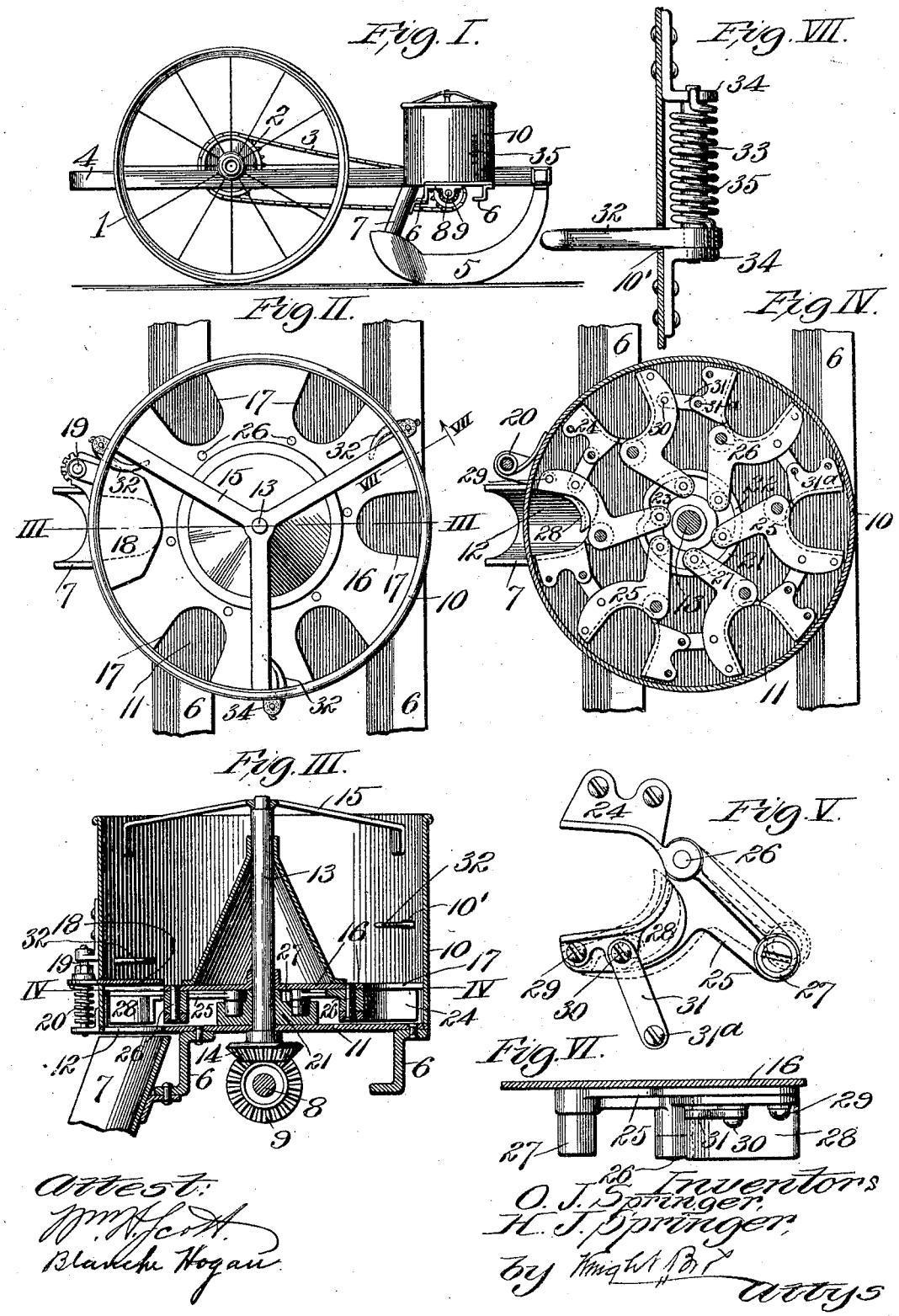

HENRY J. SPRINGER AND OTTO J. SPRINGER, OF EDWARDSVILLE, ILLINOIS, ASSIGNORS TO SPRINGER BROTHERS MANUFACTURING COMPANY, OF EDWARDSVILLE, ILLINOIS, A CORPORATION.

POTATO-PLANTER.

No. 795,657.  Specification of Letters Patent.  Patented July 25, 1905.

Application filed May 20, 1905. Serial No. 261,308.

*To all whom it may concern:*

Be it known that we, HENRY J. SPRINGER and OTTO J. SPRINGER, citizens of the United States, residing at Edwardsville, in the county of Madison and State of Illinois, have invented certain new and useful Improvements in Potato-Planters, of which the following is a full, clear, and exact description, reference being had to the accompanying drawings, forming part of this specification.

Our invention relates to a machine for dropping potatoes into the ground in hills and covering them over with the soil, the present invention being in the nature of an improvement upon the potato-planter for which Letters Patent of the United States were issued to Henry J. Springer November 24, 1903, No. 744,984.

Figure I is a side elevation of our potato-planter. Fig. II is an enlarged top or plan view of the seedbox of the planter. Fig. III is a vertical section taken through the seedbox on line III III, Fig. II. Fig. IV is a horizontal section taken on line IV IV, Fig. III. Fig. V is an enlarged inverted view of one set of the discharge members in the seedbox. Fig. VI is a side elevation of one set of the discharge members; and Fig. VII is an enlarged elevation of one of the agitator-fingers associated with the seedbox, the seedbox wall being shown in vertical section taken on line VII VII, Fig. II.

1 designates one of the ground-wheels of our planter, in which is mounted an axle having fixed thereto a driving-wheel 2, that is connected to the dropping mechanism of the planter by an endless chain 3.

4 is the frame of the machine, which is partially supported by the axle mounted in the ground-wheels and by a furrow-opener 5. Extending transversely of the frame 4 is a pair of cross-beams 6, to one of which is fixed a chute 7, that leads downwardly into a position at the rear of the furrow-opener 5.

8 is a driven shaft horizontally mounted between the cross-beams 6 and to which rotation is imparted by the endless chain 3, leading from the axle of the planter. The shaft 8 bears a bevel-pinion 9.

10 designates a seedbox mounted upon the cross-beams 6 and having a main bottom 11, that is provided with a single outlet 12, which is located immediately above the chute 7.

13 is a vertical shaft that is centrally positioned in the seedbox. This shaft extends through the main bottom of the box and has fixed to it a bevel-pinion 14, that meshes with the bevel-pinion 9, carried by the horizontal shaft 8. The upper end of the vertical shaft is stepped into a spider 15, by which the shaft is held in upright position.

16 designates a false bottom fixed to the vertical shaft 13 at an elevation above the main bottom 11 and having therein a plurality of apertures 17, through which potatoes deposited in the seedbox may descend into the chamber beneath the false bottom to be carried in the manner to be hereinafter explained to the outlet 12 of the main bottom of the seedbox.

18 is a deflector-plate which is pivotally mounted at 19 exterior of the seed box. This deflector-plate extends to the interior of the box at a point immediately above the false bottom 16 at the location of the outlet in the main bottom, the plate being controlled by a spring 20, which serves to hold the deflector-plate pressed into the seedbox.

The parts thus far described are similar to the corresponding parts in the patent hereinbefore mentioned, and no invention *per se* is herein claimed for them.

21 designates a cam-block fixed to the main bottom 11 of the seedbox. This cam-block has a groove 22 in its upper side and is provided with a cam portion 23, that is located in the block at the point thereof nearest to the outlet in the main bottom of the seedbox.

24 designates a series of flanged carrier-wings that are rigidly secured to the false bottom 16, at the rear side thereof. These carrier-wings are of a number corresponding to the number of apertures in the false bottom, and one of the wings is located at one side of each of said apertures.

25 designates swinging carrier-wings corresponding in number to the number of fixed wings 24. These swinging wings have outer arms that are located in opposition to the wings 24, and they are supported intermediate of their ends by pivot-pins 26, which pass therethrough and are seated in the false bottom 16. The inner arms of the swinging wings extend to a position above the cam-block 22 and have fitted to them rollers 27, that ride in the cam-block groove.

28 represents flanged auxiliary swinging wings that are pivoted at 29 to the ends of the outer swinging-wing arms. The auxiliary swinging wings have pivoted to them at points 30 links 31, that are in turn pivoted at 31$^a$ to the fixed wings 24 or to the false bottom 16.

When in the practical use of our planter the perforated false bottom in the seedbox is rotated through the medium of a vertical shaft 13 driven as described, the apertures in said false bottom are in turn brought into positions above the outlet in the main bottom. The apertures being brought to such position, the wings 24 and 25 are moved into a corresponding position to carry the potatoes that have been deposited between them through the apertures to the outlet. As such swinging wing moves to the outlet in the main bottom it is oscillated laterally, due to the bearing of the roller 27, carried by its inner arm against the cam 23, thereby moving the outer arm of the wing in a direction away from the opposing fixed wing 24, so that the potato may escape from its position between the wings. In the outward movement of the outer arm of the swinging wing the pivot-point 29 of the auxiliary swinging wing 28 is moved laterally. As a consequence said auxiliary swinging wing moves in a direction toward the opposing fixed wing 24 and into the space between said fixed and swinging wings. This movement is permitted, due to the hinging of the auxiliary wings through the medium of the links 31. As each auxiliary swinging wing moves in the direction stated it acts as a kicker to discharge the potato from its position between the wings.

32 designates agitator-fingers, preferably of curved form, which extend through slots 10' in the seedbox-wall to the interior of the box and which serve to prevent clogging of the potatoes within the seedbox as they are carried around upon the false bottom 16. These agitator-fingers are preferably disposed at intervals around the box and at different elevations, and each finger is carried by a rod 33, mounted in brackets 34, fixed to the seedbox-wall. Surrounding each rod is a torsion-spring 35, having one of its ends fixed to one of said brackets and its other end fixed to the agitator-finger.

We claim as our invention—

1. In a potato-planter, the combination of a seedbox having a main bottom provided with an outlet, an apertured false bottom located in said seedbox, means for rotating said false bottom, wings fixed to said false bottom at the location of the apertures therein, swinging wings opposing said fixed wings, auxiliary swinging wings associated with said swinging wings, and means for oscillating said swinging wings, substantially as set forth.

2. In a potato-planter, the combination of a seedbox having a main bottom provided with an outlet, an apertured false bottom located in said seedbox, means for rotating said false bottom, wings fixed to said false bottom at the location of the apertures therein, swinging wings opposing said fixed wings, auxiliary swinging wings associated with said swinging wings, and a cam for oscillating said swinging wings, substantially as set forth.

3. In a potato-planter, the combination of a seedbox having a main bottom provided with an outlet, an apertured false bottom rotatably mounted in said seedbox, means for rotating said false bottom, fixed wings carried by said false bottom at the location of the apertures therein, main swinging wings carried by said false bottom and opposing said fixed wings, means for oscillating said main swinging wings, and auxiliary swinging wings carried by said main swinging wings, substantially as set forth.

4. In a potato-planter, the combination of a seedbox having a main bottom provided with an outlet, an apertured false bottom rotatably mounted in said seedbox, means for rotating said false bottom, fixed wings carried by said false bottom at the location of the apertures therein, main swinging wings carried by said false bottom and opposing said fixed wings, means for oscillating said main swinging wings, auxiliary swinging wings carried by said main swinging wings, and links having pivotal connection with said auxiliary swinging wings, substantially as set forth.

5. In a potato-planter, the combination of a seedbox having a main bottom provided with an outlet, an apertured false bottom located above said main bottom, means for rotating said false bottom, and agitator-fingers working within said seedbox above said false bottom, substantially as set forth.

6. In a potato-planter, the combination of a seedbox having a main bottom provided with an outlet, an apertured false bottom located above said main bottom, means for rotating said false bottom, and spring-controlled agitator-fingers working within said seedbox above said false bottom, substantially as set forth.

7. In a potato-planter, the combination of a seedbox having a main bottom provided with an outlet, an apertured false bottom located above said main bottom, means for rotating said false bottom, rods rockingly supported by said seedbox at the exterior thereof, agitator-fingers fitted to said rods, and extending into said seedbox, and springs connected to said agitator-fingers and surrounding said rods, substantially as set forth.

H. J. SPRINGER.
OTTO J. SPRINGER.

In presence of—
R. F. TUNNELL, Jr.,
GUS SOEHLKE.